United States Patent [19]

Hulten

[11] Patent Number: 5,975,908
[45] Date of Patent: Nov. 2, 1999

[54] CUSTOM BUILDING MODELING SYSTEM AND KIT

[76] Inventor: Andrew J. Hulten, 124 Bellevue Ave., Lake Orion, Mich. 48362

[21] Appl. No.: 09/067,025

[22] Filed: Apr. 27, 1998

[51] Int. Cl.$^6$ .................................................. G09B 25/00
[52] U.S. Cl. .................................. 434/72; 434/79; 434/80
[58] Field of Search .................................. 434/72, 74, 75, 434/76, 79, 80

[56] References Cited

U.S. PATENT DOCUMENTS

| 4,551,810 | 11/1985 | Levine . |
| 4,847,778 | 7/1989 | Daley . |
| 5,668,736 | 9/1997 | Douglas et al. . |

*Primary Examiner*—Robert A. Hafer
*Assistant Examiner*—John Edmund Rovnak
*Attorney, Agent, or Firm*—Young & Basile PC

[57] ABSTRACT

A method for constructing a physical scale model of a structure includes creating a computer model of a structure using a structure design program run on a personal computer, printing out views of the interior and exterior walls of the structure on adhesive-backed paper, affixing the pieces of paper bearing the printed views of the structure to pieces of rigid stock such as cardboard or foam core to create walls, then cutting or trimming the pieces as necessary and assembling them to form the three-dimensional scale model of the structure. A kit for practicing the method contains computer software for allowing a user to custom design a building, a supply of printer-compatible adhesive-backed paper, and a supply of rigid stock of the proper thickness to represent the scale thickness of the walls of the structure. The kit may also include a videotape containing step-by-step instructions on how to construct the scale model, and a table for building displaying the completed model, the table having a hole formed in the surface thereof to allow a basement of the model to project below the surface.

13 Claims, 5 Drawing Sheets

5,975,908

CUSTOM BUILDING MODELING SYSTEM AND KIT

FIELD OF THE INVENTION

This invention relates generally to the building of scale models of structures such as homes, and more particularly to a method of constructing a physical scale model from a computer model of the structure.

BACKGROUND OF THE INVENTION

In the fields of building construction and architecture it is often desirable to create a physical scale model of a structure prior to beginning construction of the actual structure. Such a scale model may be displayed to potential customers as a sales tool, or to give a customer the opportunity to view a three-dimensional representation of a proposed building design so that the customer may make decisions regarding the design and other features of the building before beginning construction.

In the past, scale models have been built by skilled craftsmen working from either construction blue prints of a building and/or from an artist's rendering. Such models require many hours of work to complete, and accordingly are very expensive to produce.

In recent years, computer programs have been developed that allow a user to design a structure using a computer. In the course of designing a structure using such a program, the user creates a computer model of the structure. A computer model generally consists of data describing the layout and structure of the building, and may contain a great deal of information related to and describing the interior and exterior appearance of the structure, such as paint colors, types of wood trim and paneling, floor coverings, etc. After the computer model of the structure is complete, some building design programs also generate blue prints and materials lists which may be used in the construction of the actual building.

Several commercially available home-computer software packages allow a user to custom design a home, select interior color schemes and decor, and display on the computer monitor three-dimensional perspective views of the interior and exterior of the building. One such computer program is CompleteHome® sold by Sierra On-Line, Inc. Although such computer programs provide color, 3-D views of the structure from any desired vantage point, it is sometimes still desirable to have a physical scale model of a structure in order to gain a full appreciation for its appearance. It is therefore an object of this invention to provide a new, computer-based method for decreasing the time, cost, and level of skill necessary to create a physical, three-dimensional scale model of a structure.

SUMMARY OF THE INVENTION

The present invention provides an improved method for constructing a physical scale model of a structure. The method generally involves creating a computer model of a structure, printing out views of the interior and exterior walls of the structure on paper or a similar medium, affixing the pieces of paper bearing the printed views of the structure to pieces of rigid stock such as cardboard or foam core to create walls, then cutting or trimming the pieces as necessary and assembling them to form the three-dimensional scale model of the structure.

In the preferred embodiment of the invention, the computer model is created using a PC-type computer running a structure design program allowing the model to include data representing the visual appearance of surfaces of the structure, such as walls, floors and ceilings. From the computer model, the computer program generates data files for output to a printer to produce two-dimensional views of the surfaces of the walls, floors and ceilings making up the structure. These two-dimensional views are preferably in color and include windows and window treatments, floor coverings, paint, wall paper, paneling, trim and molding as desired.

In a preferred embodiment described herein, the invention method is practiced by means of a kit that may be sold commercially and which contains all or nearly all of the equipment and materials necessary to design a house or other building and to construct a scale model thereof. The kit includes computer software stored on a computer diskette or CD-ROM and which allows a user to custom design a building and create the data files necessary for output to the printer. The kit also, at a minimum, contains a supply of adhesive-backed, "peel-and-stick" paper which is compatible with the printer to be used, and a supply of a rigid stock, such as foam core or cardboard, of the proper thickness to represent the scale thickness of the walls of the structure. The kit may also include a hobby knife, glue, double sided tape, a matt board cutter, clear acetate sheets to simulate windows, etc. To allow the kit to be used by persons having little or no experience in model building, an instructional videotape may also be included, the tape containing step-by-step instructions on how to construct the model.

According to another feature of the invention, the kit may include a platform or table for building and supporting the completed model, the table having a surface with a hole or recess formed therein to allow a basement of the model to project below the surface. Such a table permits a model of a structure having a basement to be presented in a realistic looking setting, with the basement below the surface.

DETAILED DESCRIPTION OF THE PREFERRED EMBODIMENT

Figure 1:
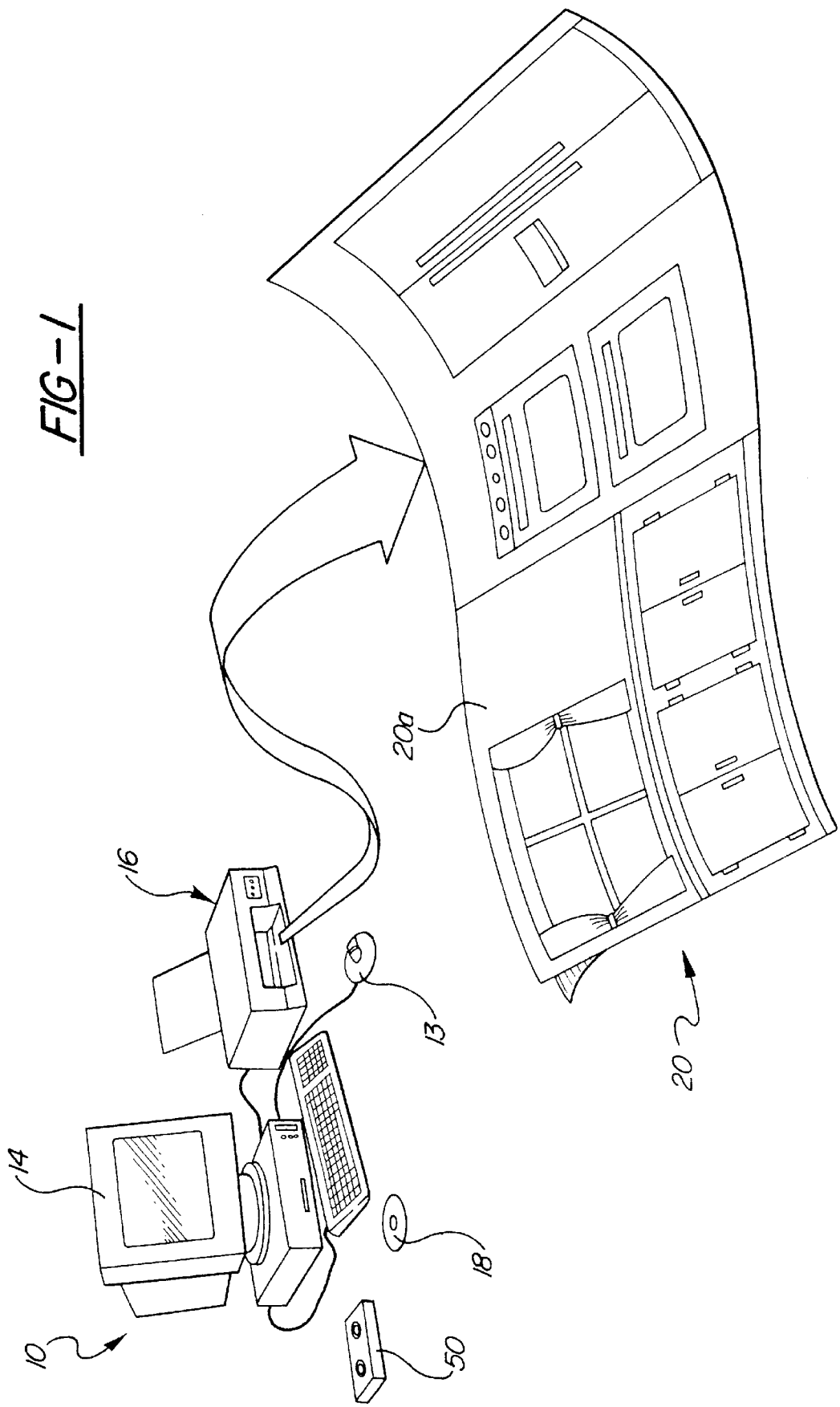
FIG. 1 is a schematic diagram showing computer equipment used to create a computer model of a structure and a sheet of peel-and-stick paper bearing a view of a kitchen wall.

FIG. 1 depicts a microprocessor-based desk top computer 10 including a keyboard 12, a mouse 13, a video monitor 14, and a printer 16. A CD-ROM 18 is shown as the storage medium for the software to be run on the computer 10 to perform the present invention, however any data storage medium compatible with the computer may be used. The printer 16 may be any of the many different types commercially available, however a color printer is preferred.

Figure 2:
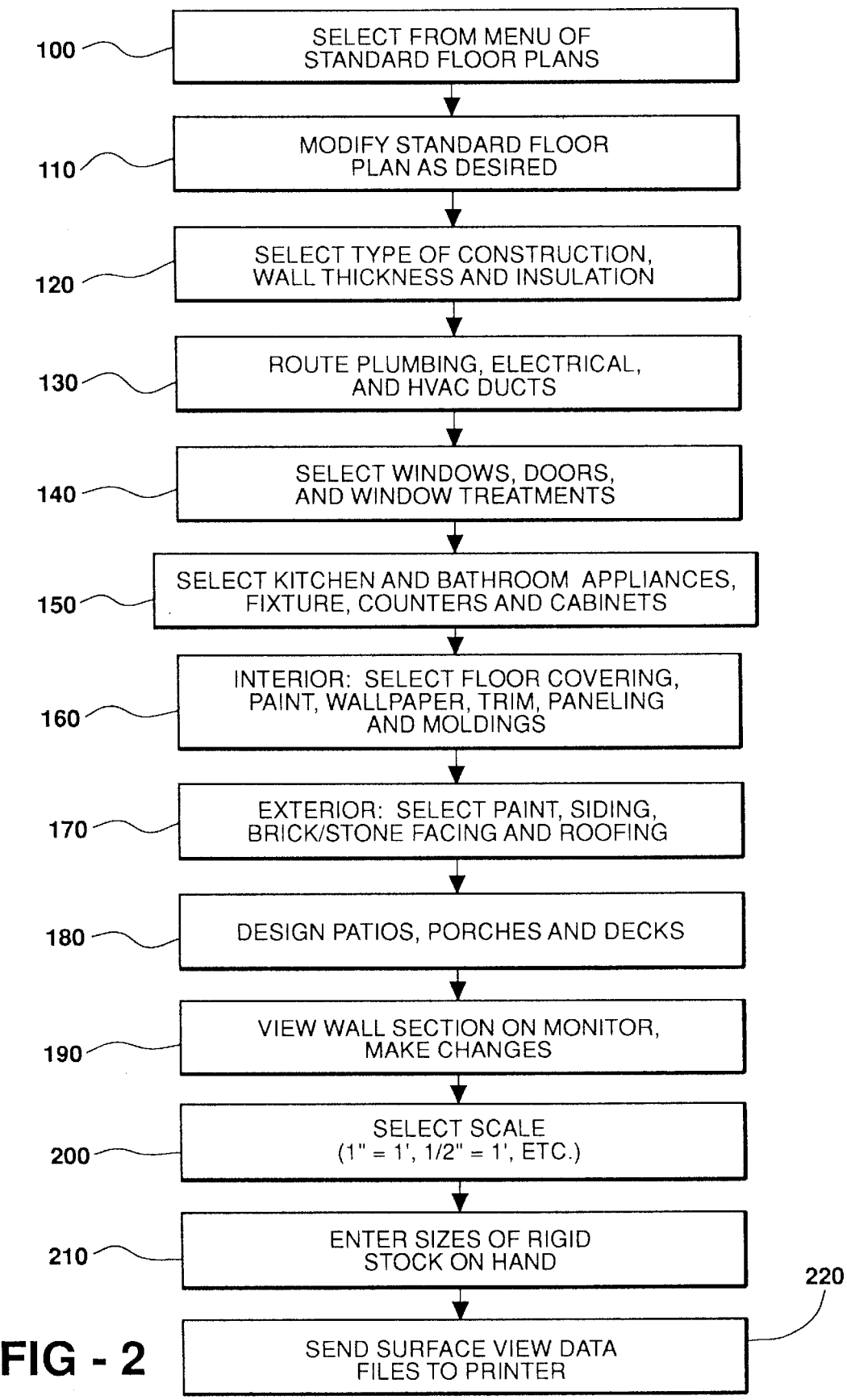
FIG. 2 is a flow chart showing steps in the creation of the computer model of the structure.

The method of the present invention is initiated by utilizing a structure design program contained on the CD-ROM 18 to create a computer model of the desired structure. The flow chart of FIG. 2 depicts in general terms a possible sequence of steps involved in the creation of a computer model using a commercially available structure design program, such as CompleteHome®, sold by Sierra On-Line, Inc. The steps described relate to the design of a home, however, with the appropriate computer software a structure of any type could be modeled on the computer 10 and the invention method used to build a three-dimensional scale model thereof. The program preferably is menu-driven, prompting the user to complete the steps in the recommended order and move on to the next step when each step is complete.

The initial step in creating a computer model of a home is to select a floor plan from a library of standard floor plans stored in the structure design program 100. The user may then modify the selected standard floor plan as desired, such as by moving, adding or deleting interior walls, doors, or windows 110. Alternatively, the program may permit the user to design a floor plan from scratch. The floor plan selected of designed may include a basement. The program also prompts the user to select the height of the interior walls and ceilings for each room of the structure, including those with cathedral or vaulted ceilings.

If the user intends to use the computer model to generate plans for building the actual structure, he/she must also select the type of construction for the structure, including details such as wall stud thickness, type and amount of insulation, brick facings, etc. 120 The computer program may also allow the user to route plumbing, electrical wiring, and HVAC (heating, ventilation, and air conditioning) ducts 130. This portion of the program may be predominantly automatic, the software containing and applying parameters on the proper sizes and routing of pipes, wiring, and ducts in accordance with accepted architectural design techniques.

When the desired floor plan is achieved, the user selects interior design features for each room. As with the floor plan, these design features may be selected from a stored library of features, depending on the purpose of each room. The user is prompted to select window styles and treatments; interior and exterior doors; kitchen cabinets, counters and built-in appliances; bathroom fixtures; floor coverings; etc. 140,150 The structure design program also contains a library of paint colors, wall paper patterns, paneling types and colors, molding, trim, etc. which may be selected to design each room 160. As the user is making the interior decor selections, he/she views on the color monitor 14 the appearance of the room being designed so that features may be changed and combined until a desired result is achieved 190.

The exterior appearance of the home is designed in a similar manner, the user selecting from various types of exterior paint, siding, shingles, brick facing, etc. 170 The structure design program may also allow the user to design patios, porches, and wooden decks 180.

The program user next selects a scale for the three-dimensional model to be built 200, for example, 1 inch=1 foot, ½ inch=1 foot, etc. The scale selected will depend on the relationship between the overall size of the structure being modeled and the desired size of the scale model to be built.

Figure 3:
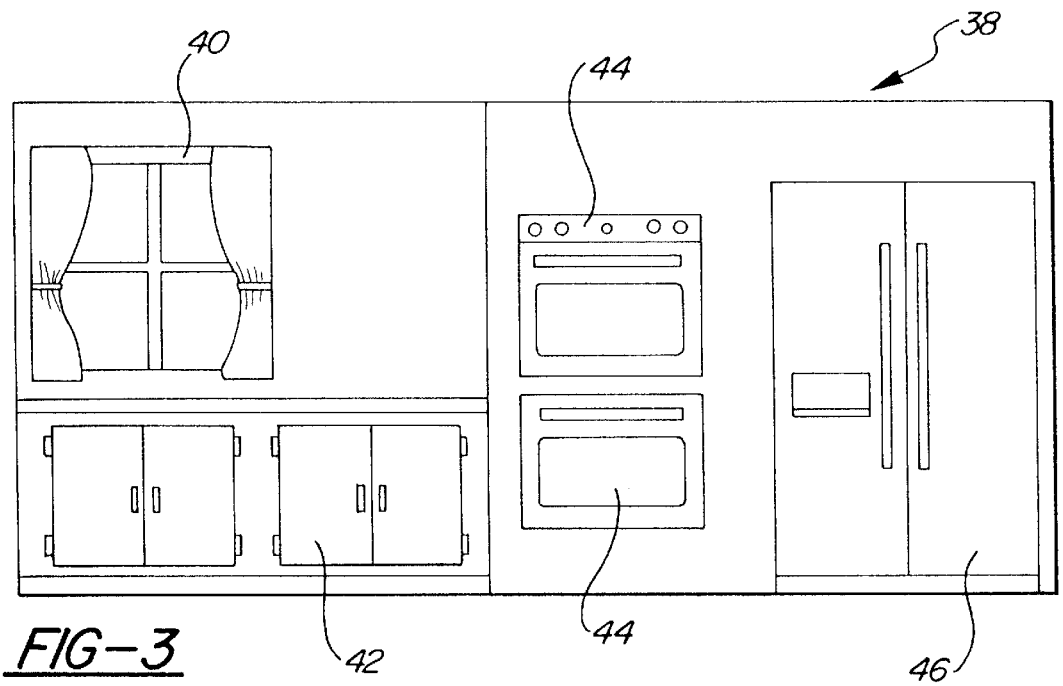
FIG. 3 is an elevation view of a kitchen wall as generated by a structure design program.

When the computer model is complete, it contains data representing the visual appearance of each of the interior and exterior surfaces of the structure that has been modeled. The computer program generates data files constituting two-dimensional representations of the visual appearance of each surface. These surface view data files are generally elevation views of the walls, plan views of the floors and upward views of the ceilings. FIG. 3 is an example of a surface view 38 of one wall of a kitchen, showing a window with drapes 40, under-counter cabinets 42, a double oven 44, and a refrigerator/freezer 46.

Upon activation of a "print" command by the program user, the structure design program sends the surface view data files to the printer 16. See block 220. The program preferably calculates the optimum layout of the surface views on the size of printing medium used in the printer 16, placing more than one surface view on each sheet of printing medium when possible, thus making the most economical use of the medium.

In the preferred embodiment of the invention method, the surface views are printed on a two-ply, peel-and-stick printing paper 20 compatible with the printer 16 (see FIG. 1). Paper 20 has an adhesive-backed top sheet 20a for receiving the image from the printer 16, and a backing sheet 20b which is peeled off to allow the top sheet to be affixed to a surface. Similar peel-and-stick paper is commonly used in computer printers for generating adhesive-backed labels; the top sheet 20a used in the invention method will not, however, be pre-cut into label-size sections, but rather will be a single, full size sheet.

Figure 4:
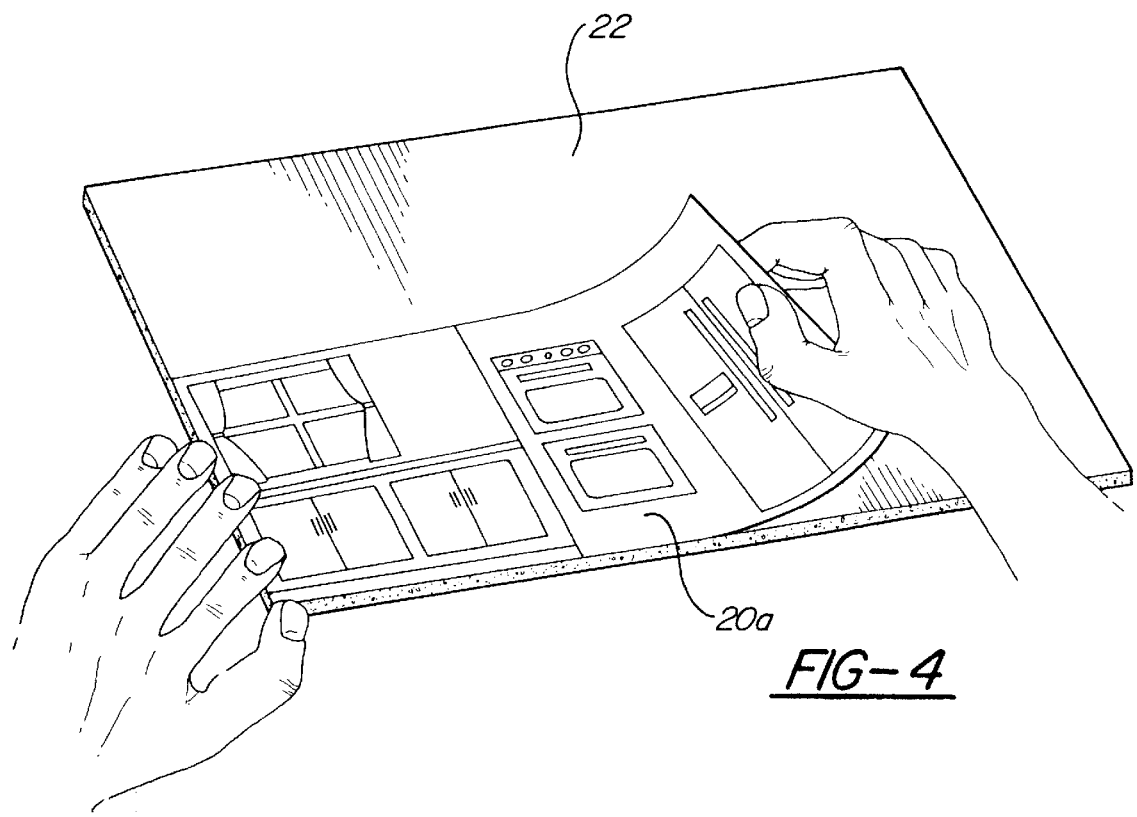
FIG. 4 shows a sheet of adhesive-backed paper bearing a wall view being affixed to a sheet of rigid stock.
Figure 5:
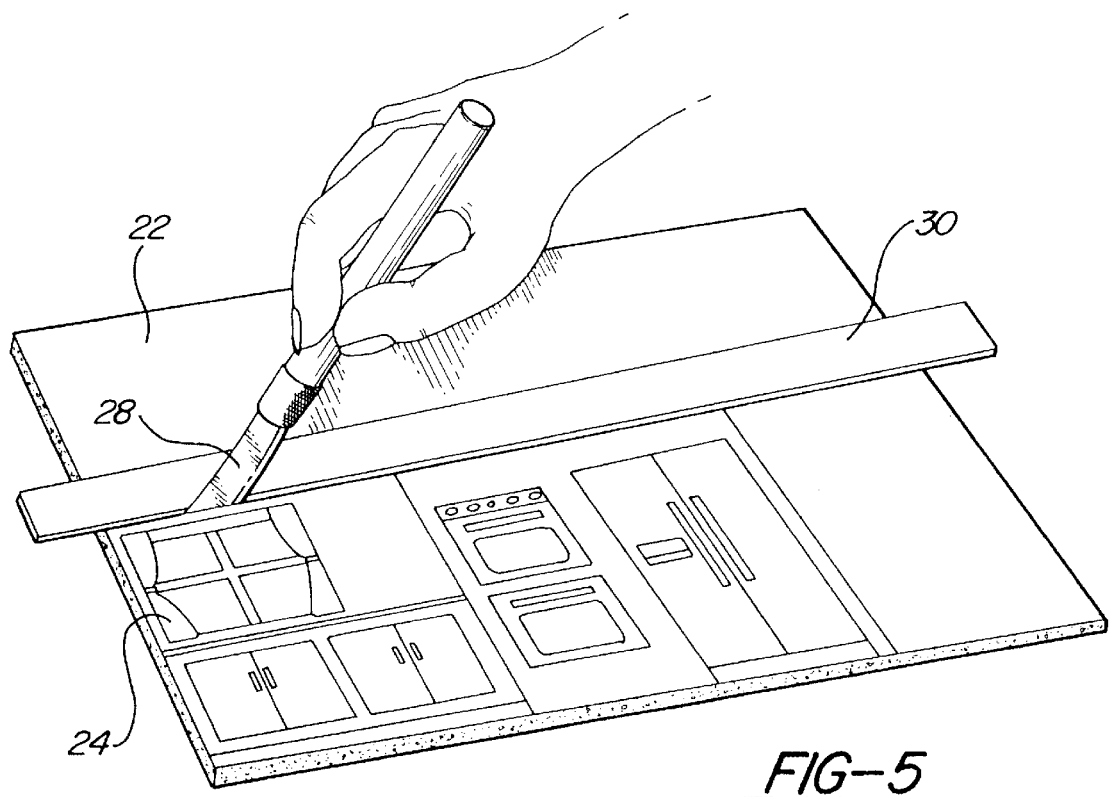
FIG. 5 shows the rigid stock being cut to produce a part to be used in construction of a scale model.

The pieces of paper 20a bearing the surface views are peeled from their backing sheets 20b and affixed to sheets of rigid stock 22, such as cardboard or foam core. See FIG. 4. The rigid stock 22 is then cut along the borders of the surface views, as seen in FIG. 5, and trimmed to produce the wall, ceiling, floor and roof pieces 24 of the scale model. Windows and doorway openings are also cut out as required at this point. If desired, small pieces of transparent film (not shown) may be cut to size and fit into or over the window openings to simulate glass.

The rigid stock 22 may be cut using a hobby knife 28 and a steel rule 30 as a guide, or using a matt board cutter (not shown) which allows the user to cut beveled edges on the rigid stock such that the wall sections are more easily joined with one another to form 90° corners between the walls. The sheets of rigid stock 22 are preferably of the correct thickness to represent the proper scale thickness of the walls and floors of the full-sized structure.

The computer program preferably contains a routine which calls for the user, before gives the "print" command, to enter into the program the dimensions of the sheets of rigid stock 22 which are to be used for construction of the model (see FIG. 2, block 210). The computer program then calculates, displays on the monitor 14 and, if desired, prints out a diagram showing the optimum manner in which to lay out the printed surface views on the rigid stock in order to minimize waste.

Most of the wall pieces 24 will have surface views affixed to both surfaces thereof. For example, the common wall separating the family room from the dining room has surface views of these two rooms on its opposite surfaces. Similarly, an exterior wall has a surface view of interior decor on a first surface and a surface view of the exterior treatment of the house on the other surface.

Figure 6:
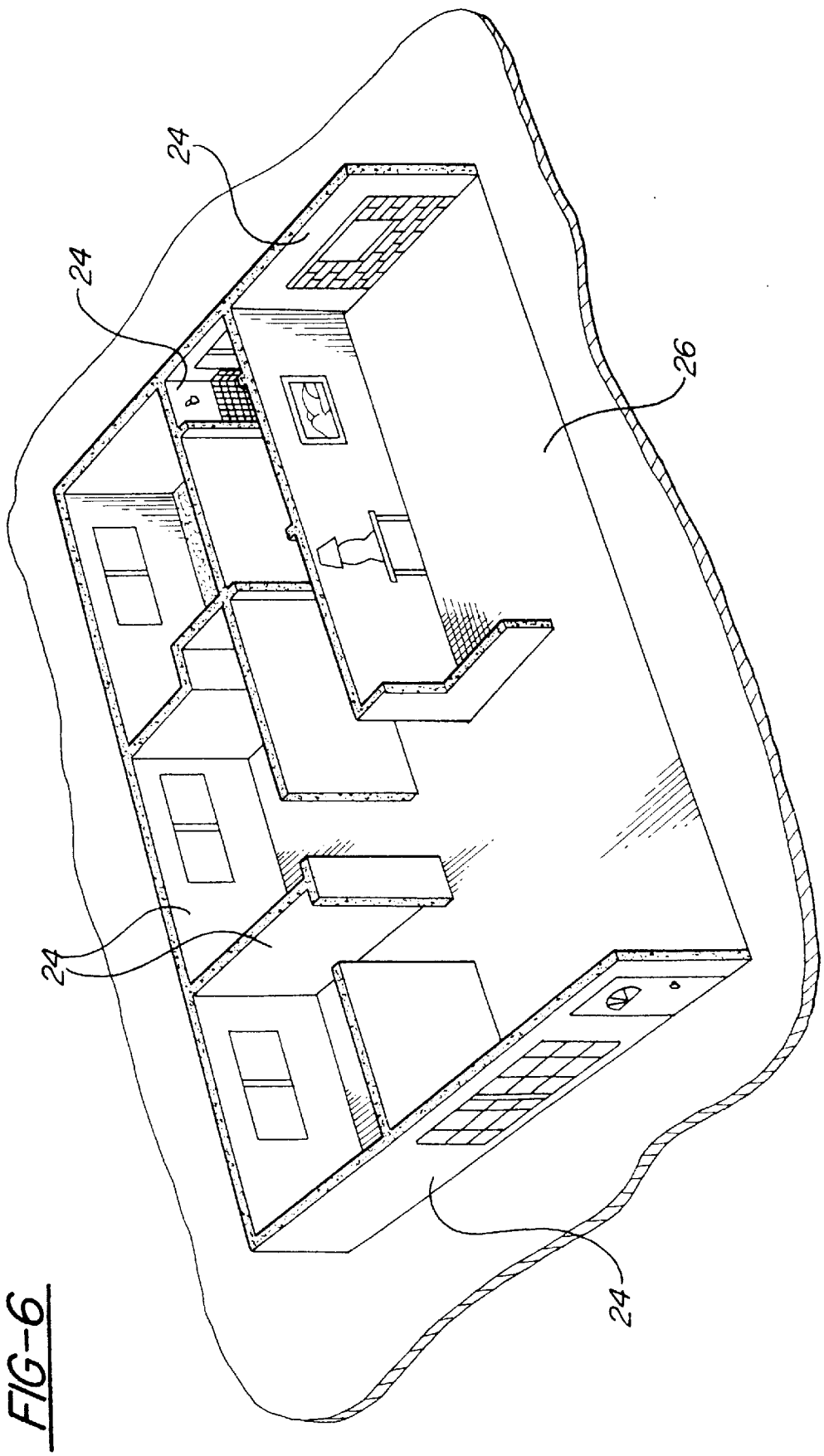
FIG. 6 shows a floor plan of the scale model with several walls in place.

After all of the scaled wall, ceiling, and roof sections 24 have been cut to their proper size, assembly of the scale model begins. This is best accomplished by printing out a floor plan 26 of the structure and affixing it on a board or other flat surface on which the model is to be built (see FIG. 6). The floor plan 26 is used as a guide, the wall pieces 24 being placed in their proper positions directly on top of it. Depending upon the size of the scale model and the maximum size of paper usable in the printer 16, several sheets of paper may be required to generate a complete floor plan.

The present invention also encompasses a scale model construction kit intended for sale to individuals with little or no experience in building scale models. Such a kit preferably contains nearly all of the materials and information required to produce the model, excluding the computer 10, its peripherals 12–14, and the printer 16. The kit preferably includes computer software capable of creating a computer model of a structure in the general manner described hereinabove. Alternatively, the software supplied with the kit may be intended for use in conjunction with another commercially available structure design program. Such a program would be capable of using the model data files created by the structure design program to generate files of the proper format for output to the printer 16 to create the surface views.

The kit preferably also contains, at a minimum, the adhesive backed two-ply paper compatible with the computer printer 16 and sheets of rigid stock in the sizes and quantities necessary to build a model. Kits may be provided in two or more different sizes for the construction of models of different sized homes. For example, a small kit may be intended for the construction of a home up to 2,000 square feet in a scale of 1 inch=1 foot, or a home up to 4,000 square feet in a scale of ½ inch=1 foot. A large size kit may be intended for the construction of a model of a home up to 4,000 square feet in scale of a 1 inch=1 foot.

Other model building supplies may be supplied in the kit, such as a hobby knife with extra blades, a matt board cutter, a steel rule, glue, and clear acetate sheets for simulating windows.

The model building kit preferably also contains a video tape 50 to be viewed by the buyer of the kit before beginning to build a model (see FIG. 1). The video tape may contain instructions on how to set up and use the computer program, as well as step-by-step instructions on how to build the model, including tips on model-building technique.

The method and kit of the present invention may be used to create a physical scale model of any type of structure including homes, office and commercial buildings, and even doll houses. Multi-story buildings may be constructed, the upper floors being constructed in essentially the same manner as the ground floor described hereinabove. Models of buildings having completely subgrade or walk-out basements may also be constructed, with materials being supplied in the kit to simulate the block construction of the basement if desired. The roof of a model home or other building is constructed from flat sheets of the rigid stock in a manner similar to that described with respect to the walls. The roof of the model is preferably removable so that the interior floor plan may be viewed. Although more complicated than a more basic model, models of homes having vaulted or cathedral ceilings, lofts, and/or sweeping stairways may also be constructed in accordance with the present invention.

Figure 7:
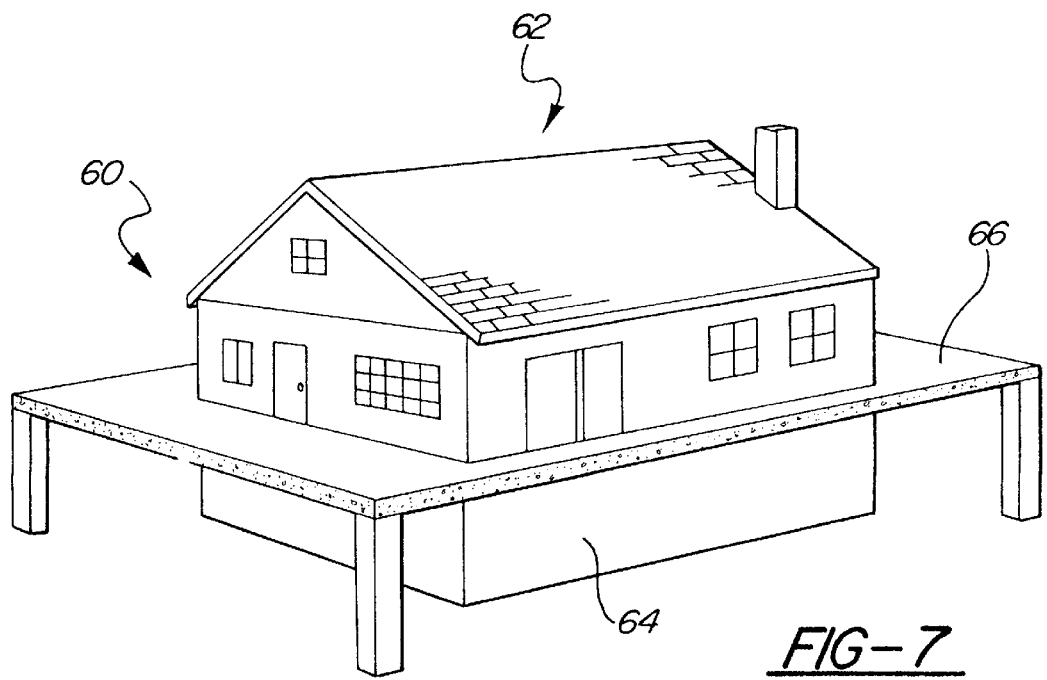
FIG. 7 shows a table for displaying a scale model having a basement.

As seen in FIG. 7, the kit may include a platform or table 60 on which a model 62 of a structure having a basement 64 may be built and displayed when complete. The table has a surface 66 with a hole or recess formed therein to allow the basement 64 of the model to project below the surface. Such a table may have a contoured surface to simulate a sloping lot, permitting the display of a model of a structure having a walk-out basement.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of constructing a scale model of a custom-designed structure comprising the steps of:

utilizing a computer running a structure design program to create a computer model of the structure, the model including data representing visual appearances of a plurality of different sections of the structure;

utilizing a printing device connected with the computer to print a plurality of two-dimensional visual representations of the structure sections onto pieces of a medium compatible with the printing device;

affixing the pieces of medium to a plurality of pieces of rigid material to create scale representations of solid portions of the structure; and assembling the pieces of rigid material with one another to create the scale model of the structure.

2. The method of claim 1 further comprising the step of cutting the pieces of rigid material to alter outlines thereof.

3. The method of claim 1 further comprising the step of cutting an opening in at least one of the pieces of rigid material and affixing a piece of transparent material in the opening to represent a window.

4. The method of claim 1 wherein the affixing step comprises affixing a first of the pieces of the medium to a first surface of one of the pieces of rigid material and a second of the pieces of the medium to an opposite second surface of the first piece of rigid material.

5. The method of claim 1 wherein the medium comprises a first ply having an adhesive coating on a back surface thereof and a second ply stuck to the adhesive coating, and the affixing step comprises separating the first ply from the second ply and sticking the first ply onto the pieces of rigid material by means of the adhesive coating.

6. The method of claim 1 further comprising the step of mounting the scale model of the structure on a table having a surface and an aperture in the surface such that a basement of the model is disposed below the surface.

7. A method of constructing a scale model of a custom-designed building utilizing a computer running a building design program and a printing device connected to the computer, the method comprising the steps of:

creating a computer model of the building including data representing visual appearances of a plurality of walls, floors, and other solid sections of the building;

printing a plurality of two-dimensional visual representations of the solid sections onto respective pieces of a thin, flexible medium;

affixing the pieces of the medium to a plurality of sheets of rigid material having a thickness equal to a scale thickness of the walls of the building;

cutting the sheets of rigid material; and assembling the scale representations of the plurality of solid sections with one another to create the scale model of the building.

8. A method of creating parts for assembly into a scale model of a structure comprising the steps of:

utilizing a computer running a structure design program to create a computer model of the structure, the model including data representing visual appearances of a plurality of different sections of the structure;

utilizing a printing device connected with the computer to print a plurality of two-dimensional visual representations of the structure sections onto pieces of a flexible medium compatible with the printing device; and affixing the pieces of flexible medium to a plurality of pieces of rigid material to create scale representations of solid portions of the structure.

9. A kit for building a physical scale model from a computer model of a structure, the kit comprising:

computer software for creating data files from the computer model, the data files containing information representing visual appearances of selected planar sections of the structure and being adapted for output to a printing device to generate visual representations of the planar sections;

rigid stock for forming walls of the scale model; and a medium for use in the printing device and comprising a first sheet for receiving a printed image of the visual representations from the printing device and having an adhesive coating on a back surface thereof and a second backing sheet, the first sheet peelable off of the backing sheet and affixable to the rigid stock by means of the adhesive coating.

10. The model building kit of claim 9 wherein the rigid stock is of a thickness representing a scale thickness of walls of the structure.

11. The model building kit of claim 9 further comprising transparent stock affixable to the rigid stock to simulate windows of the structure.

12. The model building kit of claim 9 further comprising a table for displaying the scale model, the table having a surface and an aperture in the surface such that a basement of the model is disposed below the surface.

13. The model building kit of claim 9 further comprising a videotape containing instructions on how to build the scale model.

* * * * *